United States Patent [19]
Norland et al.

[11] Patent Number: 5,166,997
[45] Date of Patent: Nov. 24, 1992

[54] CABLE RETENTION SYSTEM

[75] Inventors: Eric A. Norland, Cranbury, N.J.; Dennis G. Kohanek, Arcadia, Calif.

[73] Assignee: Norland Products Incorporated, North Brunswick, N.J.

[21] Appl. No.: 771,628

[22] Filed: Oct. 4, 1991

[51] Int. Cl.[5] .......................... G02B 6/00; G02B 6/36
[52] U.S. Cl. ........................................................ 385/87
[58] Field of Search ..................................... 385/87–94

[56] References Cited

U.S. PATENT DOCUMENTS

| | | | |
|---|---|---|---|
| 4,190,316 | 2/1980 | Malsby et al. | 350/96.18 |
| 4,744,622 | 5/1988 | Cherry et al. | 350/96.20 |
| 4,810,054 | 3/1989 | Shinbori et al. | 350/96.21 |
| 4,974,925 | 12/1990 | Troutman et al. | 350/96.20 |

OTHER PUBLICATIONS

"Field Splice Assembly For Tactical Fiber Optic Cable" By Lafaw et al. Connection Technology May, 1989 pp. 27–30.

*Primary Examiner*—Akm E. Ullah
*Attorney, Agent, or Firm*—Robert Charles Beam

[57] ABSTRACT

An optical fiber cable retention system is disclosed for use in joining or terminating optical fiber cables having as a central core at least one optical fiber with said central core surrounded by a flexible strength member. The cable retention system comprises a pair of tapered and mating engagement components defining an engagement zone therebetween within which a portion of the flexible strength member of an optical fiber cable may be held in compressive engagement, and a band of elastomeric material of suitable dimension to reside in a groove in the male engagement member.

19 Claims, 3 Drawing Sheets

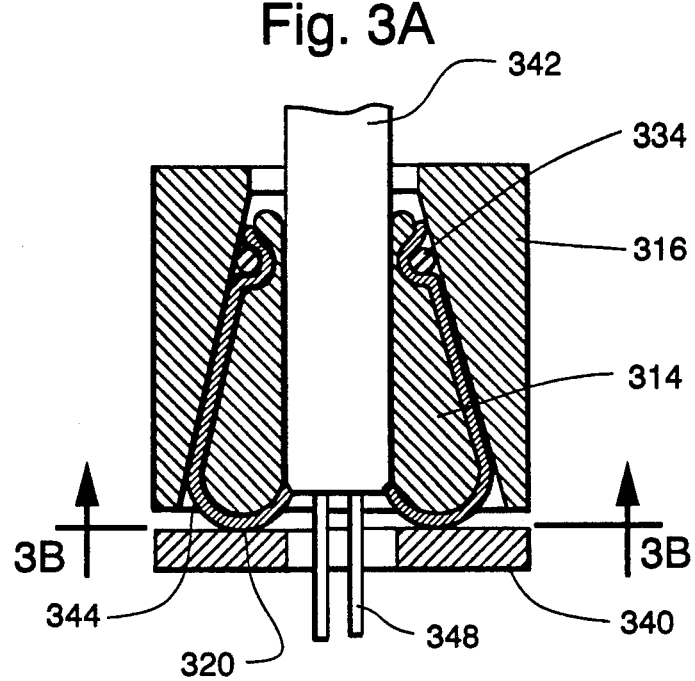
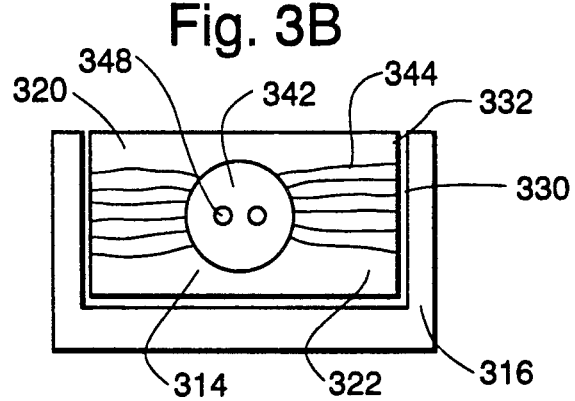
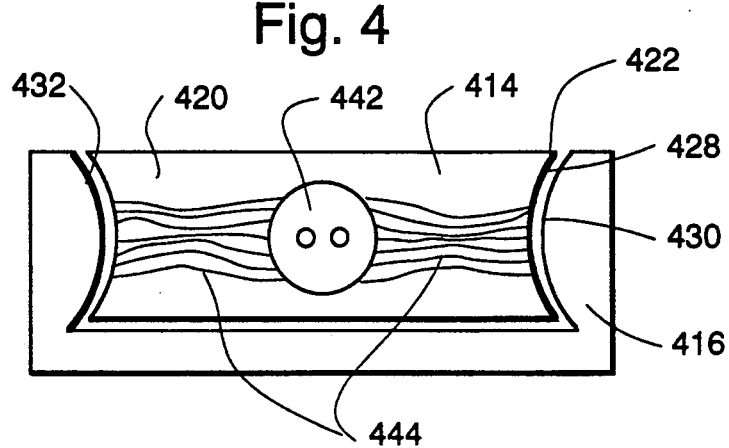

1

CABLE RETENTION SYSTEM

BACKGROUND OF THE INVENTION

1. Field of the Invention

The present invention relates to an optical fiber cable retention system for use in joining or terminating optical fiber cables. In particular, the present invention relates to an optical fiber cable retention system for use in joining or terminating optical fiber cables having as a central core at least one optical fiber with said central core being surrounded by a flexible strength member, which cable retention system comprises:

a pair of tapered and mating engagement components comprising:

a male engagement component having a central cavity sized to accommodate the diameter of said optical fiber cable, and having in at least one dimension a thickened first end at least a portion of which is rounded, and a body member at least a portion of which tapers in thickness away from said first end to an opposite end thereof, with a groove in the outer surface of said body member at some point along its length, and a female engagement component having substantially uniform outer dimension, and a central cavity sized to accommodate said male engagement component therein, and defining an engagement zone therebetween within which a portion of the flexible strength member of an optical fiber cable may be held in compressive engagement; and, a band of elastomeric material of suitable dimension to reside in the groove in the outer surface of said male engagement component.

The present invention is intended for use in a method for retaining an optical fiber cable in joining or terminating said cable, wherein said cable comprises a central core containing at least one optical fiber surrounded by a flexible strength member, wherein the method comprises:

providing a pair of tapered and mating engagement components comprising:

a male engagement component having a central cavity sized to accommodate the diameter of said optical fiber cable, and having in at least one dimension a thickened first end at least a portion of which is rounded, and a body member at least a portion of which tapers in thickness away from said first end to an opposite end thereof, with a groove in the outer surface of said body member at some point along its length, and a female engagement component having substantially uniform outer dimension, and a central cavity sized to accommodate said male engagement component therein, and defining an engagement zone therebetween within which a portion of the flexible strength member of an optical fiber cable may be held in compressive engagement;

passing the optical fiber cable through the central cavities of said engagement components;

separating a portion of the flexible strength member of said optical fiber cable from the central core of said at least one optical fiber and wrapping said portion of said flexible strength member back over the rounded, thicker end of said male engagement component, and back along the tapering portion of said body member of said male engagement component;

placing an elastomeric band of diameter suitable to reside in the groove of said male engagement component over the wrapped portion of said strength member and affixing said strength member to said male engagement component by positioning said elastomeric band over said strength member within the groove in the outer surface of said male engagement component; and, engaging said female engagement component in compressive mating engagement with said male engagement component, with the wrapped portion of said flexible strength member compressively engaged therebetween.

2. Description of the Related Art

Optical fiber cables have been used in communication for some time and have proven to have advantages over electrical systems. However, optical fiber cables contain delicate fibers which must be spliced together or connector-ized to join cables or terminate them.

These cables are typically provided with some kind of protective sheath in the form of a strength member surrounding a central core of optical fibers. Various prior art references have proposed splice housings and connectors for joining and terminating optical fiber cables, and specifically for holding the strength member in tension to prevent the cable from pulling away and placing stress on the optical fibers. Because of the fragile nature of the optical fibers, crimping, clamping, and other mechanical methods employed with electrical conductors cannot be employed.

U.S. Pat. No. 4,190,316 to Malsby, Doty and Patel shows a Lens Connector for Optical Fibers. This device is a connector for optical fibers in which two optical fibers are held in a light-transmissive relationship across a lens member. The fibers are held in place, at least in part, by male and female engagement members held within the connector backshell which engage the strength member of the optical fiber cable. The reference shows a special tool used to spread the strength member and wrap it back over the male engagement member. In practice, however, the strength member was not held in position properly to be engaged by the female engagement member and the grip on the strength member was not properly secured. When this occurred, cable strength would not be retained, and the optical fibers could break, causing the connector to fail in service.

U.S. Pat. No. 4,744,622 to Cherry and Werner shows an Optical Fiber Splice Case for joining composite cables in a tube surrounded by wire strands. The device grips the wire strands within elongated jaws which collectively form a cylindrical member which is compressed down around the wire strands to withstand tensile forces. In practice, such a device can only resist high tensile forces by clamping the optical fiber cable more securely, increasing the risk of damage to the optical fibers themselves.

U.S. Pat. No. SIR H00595 to Lafaw shows a Field Splice Assembly for Tactical Fiber Optic Cable. This device shows a two piece enclosure with a central groove to hold two optical fiber cables and a central cavity wherein the optical fibers may be joined. In this device, the optical fiber cables are held in place by the clamping action of the splice housing, permitting resistance to tensile forces only by risking damage to the optical fibers.

U.S. Pat. No. 4,974,925 to Troutman, Opdahl and Gee shows a Splice Casing Assembly in which an internal strength member is separated from the optical fibers and clamped separately. While this device avoids crimping or clamping of the optical fibers themselves, the tensile forces are still directed at disengaging the connection.

SUMMARY OF THE INVENTION

It is an object of the present invention to provide an optical fiber cable retention system for joining or terminating optical fiber cables wherein the optical fibers are not endangered by clamping or crimping or other similar mechanical methods of engaging the strength member of the optical fiber cable.

It is a further object of the present invention to provide an optical fiber cable retention system for joining or terminating optical fiber cables wherein the tensile forces on the strength member are employed to increase the gripping force on the strength member.

The other objects, features and advantages of the present invention will become more apparent in light of the following detailed descriptions of the preferred embodiments thereof.

According to one embodiment of the present invention, there is provided an optical fiber cable retention system for use in joining or terminating optical fiber cables having as a central core at least one optical fiber with said central core being surrounded by a flexible strength member, which cable retention system comprises:

a pair of tapered and mating engagement components comprising:

a male engagement component having a central cavity sized to accommodate the diameter of said optical fiber cable, and having in at least one dimension a thickened first end at least a portion of which is rounded, and a body member at least a portion of which tapers in thickness away from said first end to an opposite end thereof, with a groove in the outer surface of said body member at some point along its length, and a female engagement component having substantially uniform outer dimension, and a central cavity sized to accommodate said male engagement component therein, and defining an engagement zone therebetween within which a portion of the flexible strength member of an optical fiber cable may be held in compressive engagement; and, a band of elastomeric material of suitable dimension to reside in the groove in the outer surface of said male engagement component.

According to another embodiment of the present invention, there is provided an optical fiber cable retention system for use in joining or terminating optical fiber cables having as a central core at least one optical fiber with said central core being surrounded by a flexible strength member, which cable retention system comprises:

a pair of tapered and mating engagement components comprising:

a male engagement component having a central cavity sized to accommodate the diameter of said optical fiber cable, a rounded and thicker first end and a cone-shaped body member tapering in diameter away from said first end to an opposite end, with an annular groove in the outer surface of said body member at some point along its length, and, a female engagement component having a substantially cylindrical outer surface and a central cavity sized to accommodate said male engagement component therein, and defining an engagement zone therebetween within which a portion of the flexible strength member of an optical fiber cable may be held in compressive engagement; and, a band of elastomeric material of suitable diameter to reside in the annular groove of said male engagement component.

According to still another embodiment of the present invention, there is provided a method for retaining an optical fiber cable in joining or terminating said cable, wherein said cable comprises a central core containing at least one optical fiber surrounded by a flexible strength member, wherein the method comprises:

providing a pair of tapered and mating engagement components comprising:

a male engagement component having a central cavity sized to accommodate the diameter of said optical fiber cable, and having in at least one dimension a thickened first end at least a portion of which is rounded, and a body member at least a portion of which tapers in thickness away from said first end to an opposite end thereof, with a groove in the outer surface of said body member at some point along its length, and a female engagement component having substantially uniform outer dimension, and a central cavity sized to accommodate said male engagement component therein, and defining an engagement zone therebetween within which a portion of the flexible strength member of an optical fiber cable may be held in compressive engagement;

passing the optical fiber cable through the central cavities of said engagement components;

separating a portion of the flexible strength member of said optical fiber cable from the central core of said at least one optical fiber and wrapping said portion of said flexible strength member back over the rounded, thicker end of said male engagement component, and back along the tapering portion of said body member of said male engagement component;

placing an elastomeric band of diameter suitable to reside in the groove of said male engagement component over the wrapped portion of said strength member and affixing said strength member to said male engagement component by positioning said elastomeric band over said strength member within the groove in the outer surface of said male engagement component; and, engaging said female engagement component in compressive mating engagement with said male engagement component, with the wrapped portion of said flexible strength member compressively engaged therebetween.

According to a still further embodiment of the present invention, there is provided a method for retaining an optical fiber cable in joining or terminating said cable, wherein said cable comprises a central core containing at least one optical fiber surrounded by a flexible strength member, wherein the method comprises:

providing a pair of tapered and mating engagement components comprising:

a male engagement component having a central cavity sized to accommodate the diameter of said optical fiber cable, a rounded and thicker first end and a cone-shaped body member tapering in diameter away from said first end to an opposite end, with an annular groove in the outer surface of said body member at some point along its length, and, a female engagement component having a substantially cylindrical outer surface and a central cavity sized to accommodate said male engagement component therein, and defining an engagement zone therebetween within which a portion of the flexible strength member of an optical fiber cable may be held in compressive engagement;

passing the optical fiber cable through the central cavities of said engagement components;

separating a portion of the flexible strength member of said optical fiber cable from the central core of said at least one optical fiber and wrapping said portion of said flexible strength member back over the rounded, thicker end of said male engagement component, and back along the tapering cone-shaped body member of said male engagement component;

placing an elastomeric band of diameter suitable to reside in the annular groove of said male engagement component over the wrapped portion of said strength member and affixing said strength member to said male engagement component by positioning said elastic band over said strength member within the annular groove in the outer surface of said male engagement component; and, engaging said female engagement component in compressive mating engagement with said male engagement component, with the wrapped strength member compressively engaged therebetween.

BRIEF DESCRIPTION OF THE DRAWINGS

FIG. 3A shows a top view of another embodiment of the optical fiber cable retention system of the present invention, with the strength member of an optical fiber cable held in engagement.

FIG. 3B shows an end view from the first end of the optical fiber cable retention system of the embodiment shown in FIG. 3A, taken along the line A—A of FIG. 3A, with the strength member of an optical fiber cable held in engagement.

FIG. 4 shows an end view from the first end of another embodiment of the optical fiber cable retention system of the present invention, with the strength member of an optical fiber cable held in engagement.

DETAILED DESCRIPTION OF THE PRESENT INVENTION

The present invention is directed to an optical fiber cable retention system for providing high strength cable retention in the joining or terminating an optical fiber cable. In the present invention, the strength member of the cable passes unobstructed through the middle of a pair of tapered and mating engagement components, and is then wrapped back and compressed between the mating surfaces of the engagement components. In such a construction, the frictional gripping forces on the strength member are greater than the initial tensile forces applied to the cable. As additional tension is applied, the strength member pulls the interior mating engagement surfaces into tighter mating engagement, compressing the strength member further, and the gripping forces increase linearly as tension is increased, maximizing the cable retention strength.

Figure 1:
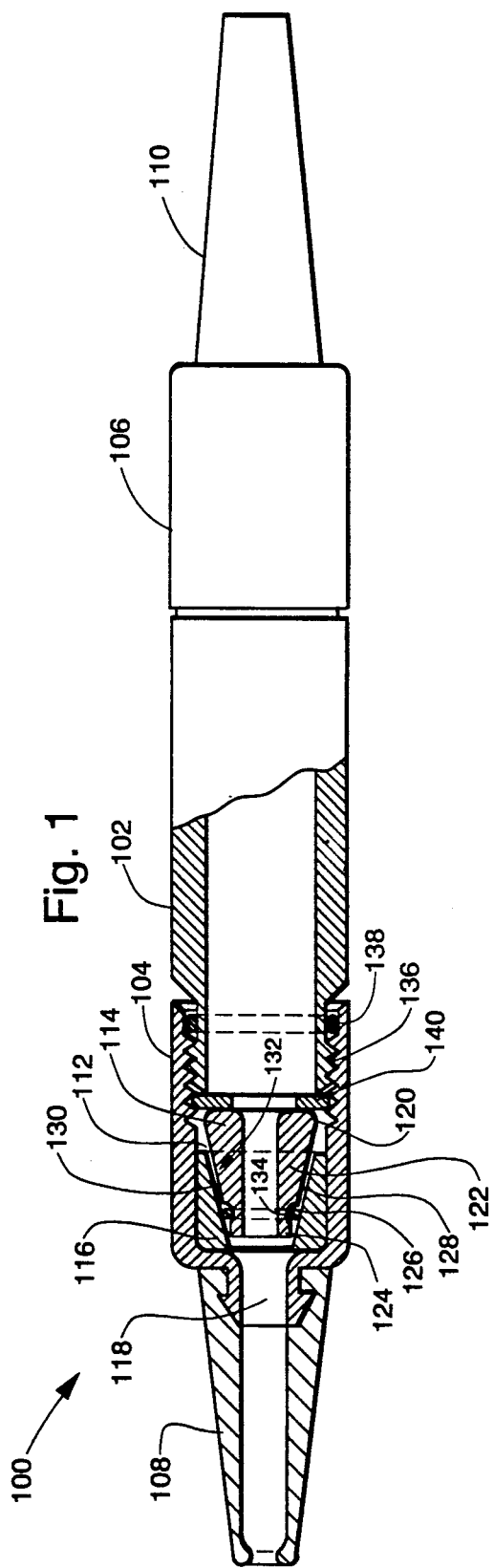
FIG. 1 partially in cross-section, shows the optical fiber cable retention system of the present invention as it would be employed in a cable splice apparatus.

The optical fiber cable retention system of the present invention can be seen in the optical fiber splice housing 100 shown partially in cross-section in FIG. 1. The optical fiber splice housing 100, illustrated in FIG. 1, would be comprised of a central optical splice area 102, with end caps 104 and 106, and boots 108 and 110 at each end thereof. Within the confines of the end cap 104, the optical fiber cable retention system 112 of the present invention is intended to reside.

The optical fiber cable retention system 112 of the present invention is intended to engage the strength member of an optical fiber cable between a pair of tapered and mating engagement components 114 and 116. Male engagement component 114 has a central cavity 118 sized to accommodate the diameter of an optical fiber cable, and has a thickened first end 120 at least a portion of which is rounded, and a body member 122 at least a portion of which tapers in thickness away from the first end 120 to an opposite end 124. Intermediate to the first end 120 and the opposite end 124 is a groove 126 at some point along the outer surface 128 of the body member 122.

The optical fiber cable retention system 112 of the present invention further comprises female engagement component 116 which has a substantially uniform outer dimension and a central cavity 130 sized to accommodate the mating male engagement component 114 therein. Together, male engagement component 114 and female engagement component 116 define an engagement zone 132 therebetween.

The optical fiber cable retention system 112 shown in FIG. 1 further comprises a band of elastomeric material 134 of suitable dimension to reside in the groove 126 in the outer surface 128 of the male engagement member 114.

Also housed within the end cap 104 of splice housing 100 and acting as a pressure plate against the thickened first end 120 of male engagement component 114 is split washer 140.

The optical fiber splice housing 100 shown in FIG. 1 is intended to be sealed, and end cap 104 is provided threads 136 and O-ring 138 to effect such a seal. Likewise, boot 108 surrounds and seals the optical fiber cable entering the splice housing 100.

One skilled in the art would readily recognize that the same optical fiber cable retention system 112 could be employed in a terminating connector for use with an optical fiber cable. Further, the present invention has application to such items as connector housings, splice housings, cable enclosures, patch panels or any other cable terminating device at any location in an optical fiber communication system.

Figure 2B:
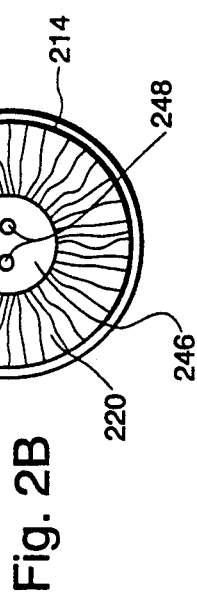
FIG. 2B shows an end view from the first end of the optical fiber cable retention system of the embodiment shown in FIG. 2A, taken along the line A—A of FIG. 2A, with the strength member of an fiber cable held in engagement.
Figure 2A:
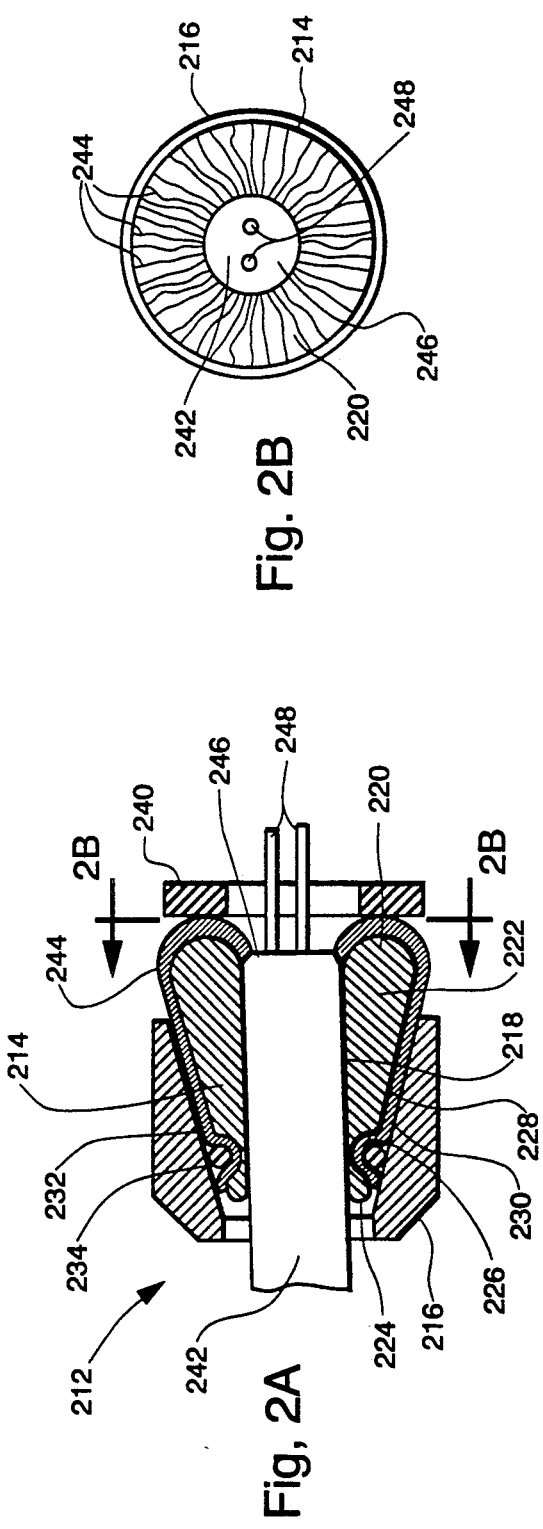
FIG. 2A shows a cross-sectional view of one embodiment of the optical fiber cable retention system of the present invention, with the strength member of an optical fiber cable held in engagement.

FIG. 2A shows a cross-sectional view of one embodiment of the optical fiber cable retention system of the present invention, with the strength member of an optical fiber cable held in engagement. As shown therein, optical fiber cable retention system 212 comprises male engagement component 214 and female engagement component 216. The male engagement component 214 comprises central cavity 218, a thickened first end 220 which is rounded, tapered body member 222, and opposite end 224. Intermediate first end 220 and opposite end 224 is an annular groove 226 on the outer surface 228 of the male engagement component 214.

Female engagement component 216 has a substantially uniform outer dimension and a central cavity 230 sized to accommodate the male engagement component 214 therein, defining an engagement zone 232 therebetween. Also shown in FIG. 2A a band of elastomeric material 234 of suitable dimension to reside in the groove 226 in the outer surface 228 of the male engagement component 214.

The tapered and mating engagement components may be symmetrical in at least one dimension, and their mating surfaces may be at any angle up to forty-five degrees (45°) from the centerline of the components in their symmetrical dimensions. This angle has been found advantageous in practice, as it is believed to translate a majority of the tensile pulling force on the interior mating surfaces of the engagement components into a compressive force on the strength member within the engagement zone formed by the engagement components.

The engagement components themselves may be round or geometrical in shape and may be made from a variety of materials such as metal, plastic or ceramic, or any combination of them. One or more of the engagement components may be made of a deformable material or may be formed of some relatively hard material. A relatively hard material may be coated with a deformable material, or may be smooth or coarse, knurled, or grooved, to optimize the frictional gripping force on the strength member of an optical fiber cable.

Also shown in FIG. 2A is optical fiber cable 242, which has been affixed within the optical fiber cable retention system of the present invention. This is done by passing the optical fiber cable 242 through the central cavity 230 of female engagement component 216 and the central cavity 218 of male engagement component 214, then separating the strength member 244 of the optical fiber cable 242 from the central core 246 of optical fibers 248.

The present invention is intended for use in attaching cables with any flexible strength member, whether comprised of natural or synthetic fibers such as aramid fibers, commercially known as Kevlar®, or metal wires, whether such fibers be straight, woven or twisted.

The separated strength member 244 is then wrapped back over the rounded, thicker end 220 of the male engagement component 214 and back along the tapering portion of the body member 222 of the male engagement component 214. An band of elastomeric material 234 of diameter suitable to reside in the groove 226 in the outer surface 228 of the body member 222 of the male engagement component 214 is then placed over the wrapped portion of the strength member 244. The strength member 244 is thus affixed to the male engagement member 214 by positioning the elastomeric band 234 over the strength member 244 within the groove 226 in the outer surface 228 of the body member 222 of the male engagement component 214.

When the strength member 244 of the optical fiber cable 242 has been thus affixed to the male engagement component 214 the female engagement component 216 is then engaged, in mating engagement with the male engagement component 214, defining an engagement zone 232 therebetween, with the wrapped strength member 244 of the optical fiber cable 242 therebetween.

FIG. 2B shows an end view from the first end of the optical fiber cable retention system of the embodiment shown in FIG. 2A, taken along the line A—A of FIG. 2A, with the strength member 244 of an optical fiber cable 242 held in engagement. This view shows the female engagement component 216 and the male engagement component 214 in engagement position holding the strength member 244 of optical fiber cable 242, which strength member 244 is shown of individual strands of some fiber, such as Kevlar®, a commercially available aramid fiber. These fibers are shown splayed out around the thickened and rounded first end 220 of male engagement component 214.

FIG. 3A shows a top view of another embodiment of the optical fiber cable retention system of the present invention, with the strength member 344 of an optical fiber cable 342 held in engagement between a pair of tapered and mating engagement components comprising a male engagement component 314 and a female engagement component 316. The strength member 344 is separated from the central core 346 of the optical fiber cable 342 containing the optical fibers 348. The strength member 344 is then wrapped over the thickened and rounded first end 320 of the male engagement component 314, affixed by elastomeric band 334, and then engaged by female engagement component 316.

FIG. 3B shows an end view from the first end of the optical fiber cable retention system of the embodiment shown in FIG. 3A, taken along the line A—A of FIG. 3A, with the strength member 344 of the optical fiber cable 342 held in engagement. In this embodiment, the thickened and rounded first end 320 is required in only one dimension, and the engagement zone 332 is comprised of a male engagement component 314 having a body member 322 with planar walls and a female engagement component 316 having a central cavity 330 with mating planar walls.

FIG. 4 shows an end view from the first end of another embodiment of the optical fiber cable retention system of the present invention, with the strength member 444 of an optical fiber cable 442 held in engagement between a pair of tapered and mating engagement components. In this embodiment also, the thickened first end 420 is required in only one dimension. Unlike the embodiment shown in FIGS. 3A and 3B, however, the engagement zone 432 is not defined by planar walls, but by a concave outer surface 428 on the body member 422 of male engagement component 414 and a mating convex central cavity 430 of the female engagement component 416.

Figure 5:
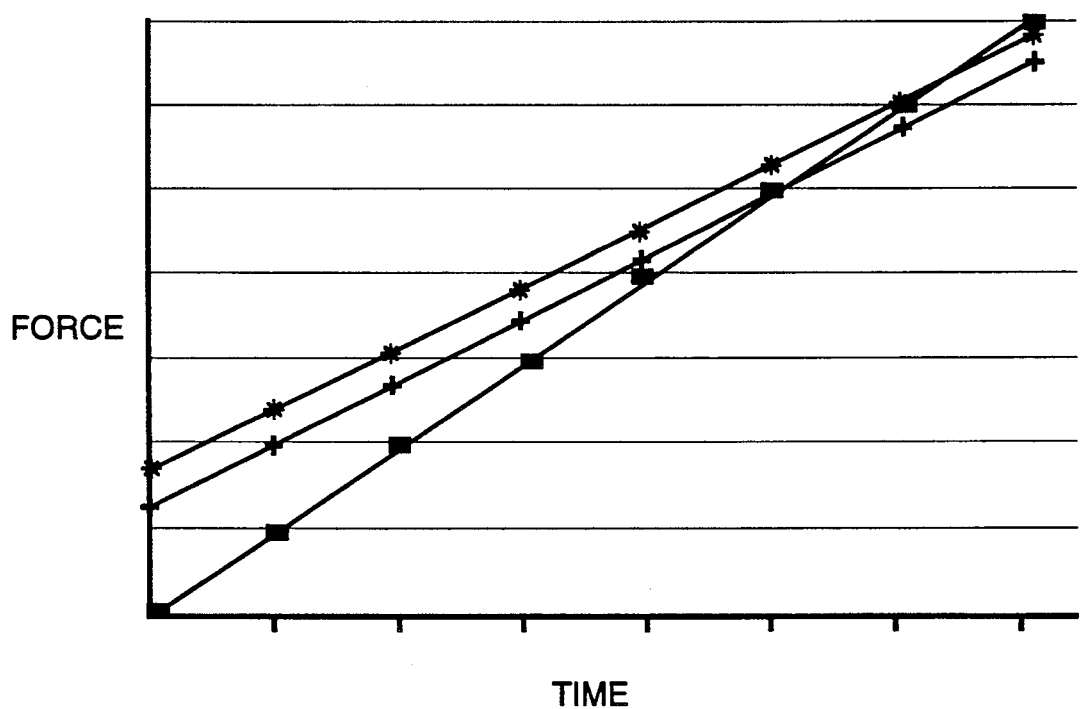
FIG. 5 shows the theoretical relationship between the gripping force of the optical fiber cable retention system of the present invention and the tensile force pulling on the optical cable.

FIG. 5 shows the theoretical relationship between the tensile force pulling on an optical cable and the gripping force of the optical fiber cable retention system of the present invention. As the graph depicts, as the tensile force 550 increases, the gripping strength 552 increases as well. Because of the inherent inefficiencies in the mechanical system, however, the gripping strength 552 does not increase at the same rate. At some point in such a system, the tensile force 550 will be greater than the gripping strength 552 and failure of the system will occur. Under the same circumstances, a second gripping strength 554 with a higher initial gripping strength, will resist failure longer. To maximize cable retention, therefore, the initial gripping strength should be as high a possible.

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed is:

1. An optical fiber cable retention system for use in joining or terminating optical fiber cables having as a central core at least one optical fiber with said central core being surrounded by a flexible strength member, which cable retention system comprises:

a pair of tapered and mating engagement components comprising:

a male engagement component having a central cavity sized to accommodate the diameter of said optical fiber cable, and having in at least one dimension a thickened first end at least a portion of which is rounded, and a body member at least a portion of which tapers in thickness away from said first end to an opposite end thereof, with a groove in the outer surface of said body member at some point along its length, and a female engagement component having substantially uniform outer dimension, and a central cavity sized to accommodate said male engagement component therein, and defining an engagement zone therebetween within which a portion of the flexible strength member of an optical fiber cable may be held in compressive engagement; and, a band of elastomeric material of suitable dimension to reside in the groove in the outer surface of said male engagement component.

2. The optical fiber cable retention system of claim 1 wherein said engagement zone is defined in only one dimension.

3. The optical fiber cable retention system of claim 2 wherein the tapered surfaces of said engagement zone are substantially planar.

4. The optical fiber cable retention system of claim 2 wherein the tapered surfaces of said engagement zone are further defined as being concave on the outer surface of said male engagement component and convex on the inner surface of said female engagement component.

5. An optical fiber cable retention system for use in joining or terminating optical fiber cables having as a central core at least one optical fiber with said central core being surrounded by a flexible strength member, which cable retention system comprises:

a pair of tapered and mating engagement components comprising:

a male engagement component having a central cavity sized to accommodate the diameter of said optical fiber cable, a rounded and thicker first end and a cone-shaped body member tapering in diameter away from said first end to an opposite end, with an annular groove in the outer surface of said body member at some point along its length, and a female engagement component having a substantially cylindrical outer surface and a central cavity sized to accommodate said male engagement component therein, and defining an engagement zone therebetween within which a portion of the flexible strength member of an optical fiber cable may be held in compressive engagement; and, a band of elastomeric material of suitable diameter to reside in the annular groove of said male engagement component.

6. The optical fiber cable retention system of claim 1 for use with an optical fiber cable having a single strength member.

7. The optical fiber cable retention system of claim 1 for use with an optical fiber cable having a multi-part strength member.

8. The optical fiber cable retention system of claim 7 wherein the optical fiber cable strength member is composed of natural or synthetic fibers.

9. The optical fiber cable retention system of claim 8 wherein the optical fiber cable strength member is composed, at least in part, of aramid fibers.

10. The optical fiber cable retention system of claim 7 wherein the optical fiber strength member is composed, at least in part, of metallic wires.

11. The optical fiber cable retention system of claim 7 wherein the optical fiber strength member is composed of fibers which are straight, woven or twisted.

12. The optical fiber cable retention system of claim 1 wherein the engagement components are formed or metal, plastic, ceramic or some combination thereof.

13. The optical fiber cable retention system of claim 1 wherein the engagement components are formed of a deformable material.

14. The optical fiber cable retention system of claim wherein the engagement components are formed of a relatively hard material coated with a deformable material.

15. The optical fiber cable retention system of claim 1 wherein at least a portion of the mating surfaces of the engagement components are coarse, knurled or grooved.

16. The optical fiber cable retention system of claim 1 wherein the taper of the mating engagement components may be from at an angle of from five degrees (5°) to forty-five degrees (45°) from the centerline of the optical fiber cable.

17. The optical fiber cable retention system of claim 1 wherein the rounded first end of the male engagement component is provided with a smooth surface and a large radius curvature to preclude cutting the strength member.

18. A method for retaining an optical fiber cable in joining or terminating said cable, wherein said cable comprises a central core containing at least one optical fiber surrounded by a flexible strength member, wherein the method comprises:

providing a pair of tapered and mating engagement components comprising:

a male engagement component having a central cavity sized to accommodate the diameter of said optical fiber cable, and having in at least one dimension a thickened first end at least a portion of which is rounded, and a body member at least a portion of which tapers in thickness away from said first end to an opposite end thereof, with a groove in the outer surface of said body member at some point along its length, and a female engagement component having substantially uniform outer dimension, and a central cavity sized to accommodate said male engagement component therein, and defining an engagement zone therebetween within which a portion of the flexible strength member of an optical fiber cable may be held in compressive engagement;

passing the optical fiber cable through the central cavities of said engagement components;

separating a portion of the flexible strength member of said optical fiber cable from the central core of said at least one optical fiber and wrapping said portion of said flexible strength member back over the rounded, thicker end of said male engagement component, and back along the tapering portion of said body member of said male engagement component;

placing an elastomeric band of diameter suitable to reside in the groove of said male engagement component over the wrapped portion of said strength member and affixing said strength member to said male engagement component by positioning said elastomeric band over said strength member within the groove in the outer surface of said male engagement component; and, engaging said female engagement component in compressive mating engagement with said male engagement component, with the wrapped portion of said flexible strength member compressively engaged therebetween.

19. A method for retaining an optical fiber cable in joining or terminating said cable, wherein said cable comprises a central core containing at least one optical fiber surrounded by a flexible strength member, wherein the method comprises:

providing a pair of tapered and mating engagement components comprising:

a male engagement component having a central cavity sized to accommodate the diameter of said optical fiber cable, a rounded and thicker first end and a cone-shaped body member tapering in diameter away from said first end to an opposite end, with an annular groove in the outer surface of said body member at some point along its length, and, a female engagement component having a substantially cylindrical outer surface and a central cavity sized to accommodate said male engagement component therein, and defining an engagement zone therebetween within which a portion of the flexible strength member of an optical fiber cable may be held in compressive engagement;

passing the optical fiber cable through the central cavities of said engagement components;

separating a portion of the flexible strength member of said optical fiber cable from the central core of said at least one optical fiber and wrapping said portion of said flexible strength member back over the rounded, thicker end of said male engagement component, and back along the tapering cone-shaped body member of said male engagement component;

placing an elastomeric band of diameter suitable to reside in the annular groove of said male engagement component over the wrapped portion of said strength member and affixing said strength member to said male engagement component by positioning said elastic band over said strength member within the annular groove in the outer surface of said male engagement component; and, engaging said female engagement component in compressive mating engagement with said male engagement component, with the wrapped strength member compressively engaged therebetween.

* * * * *